Aug. 22, 1961  J. W. KREUTTNER  2,997,240
AIR CONDITIONING SYSTEM MIXING VALVE
Filed Sept. 23, 1957  3 Sheets-Sheet 2
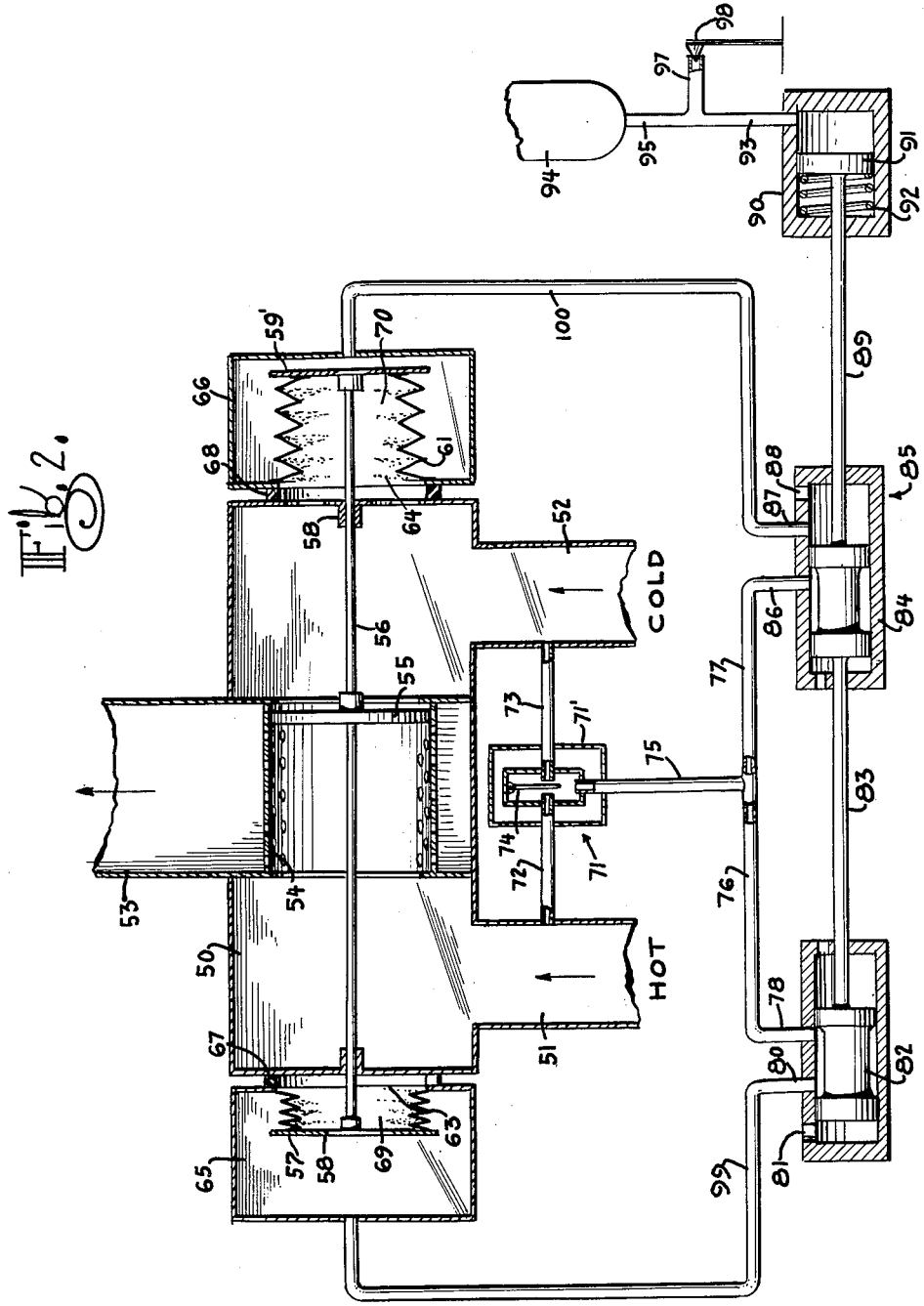
INVENTOR
JOSEPH W. KREUTTNER
BY
Pollard Johnston Smythe & Robertson
ATTORNEYS

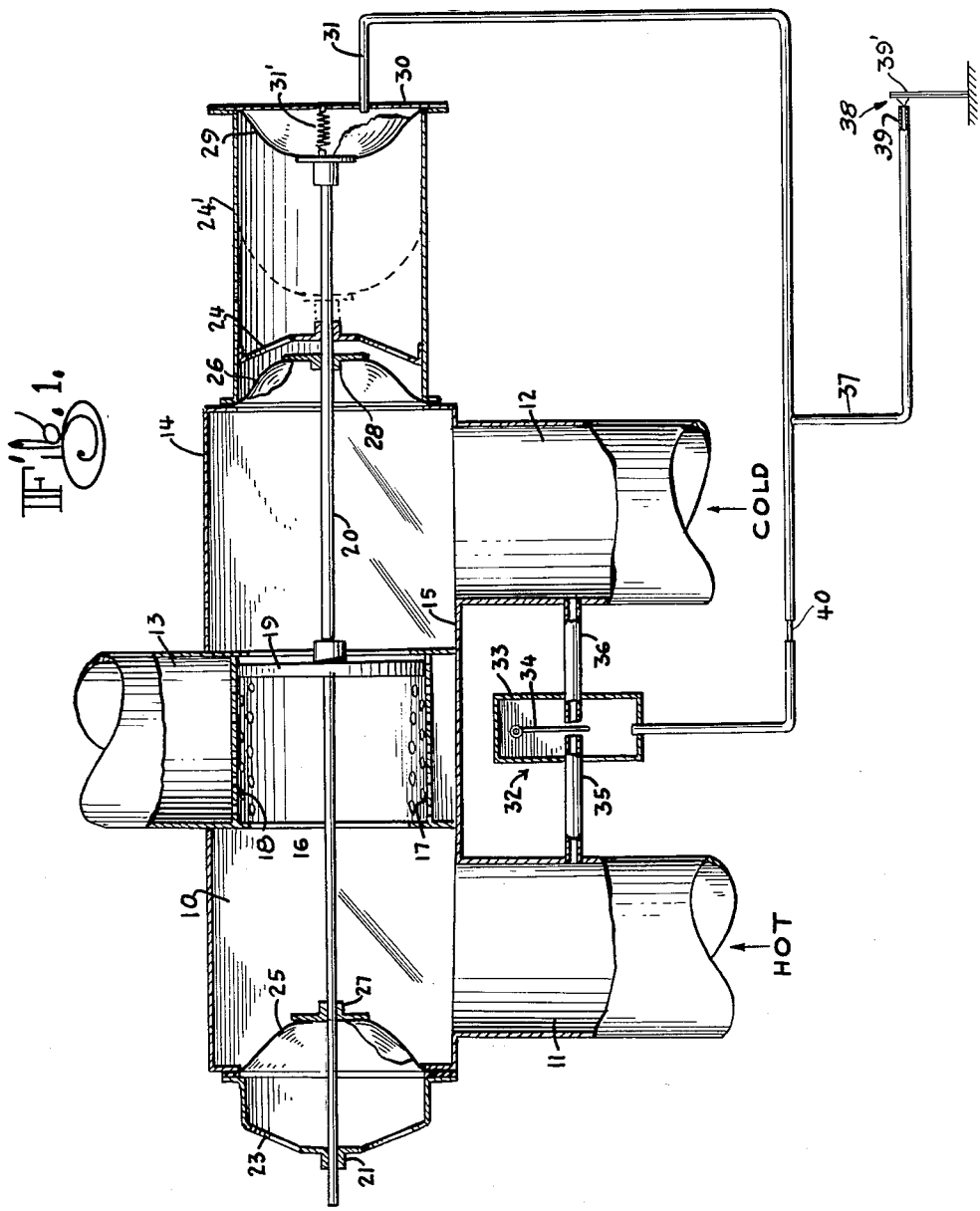

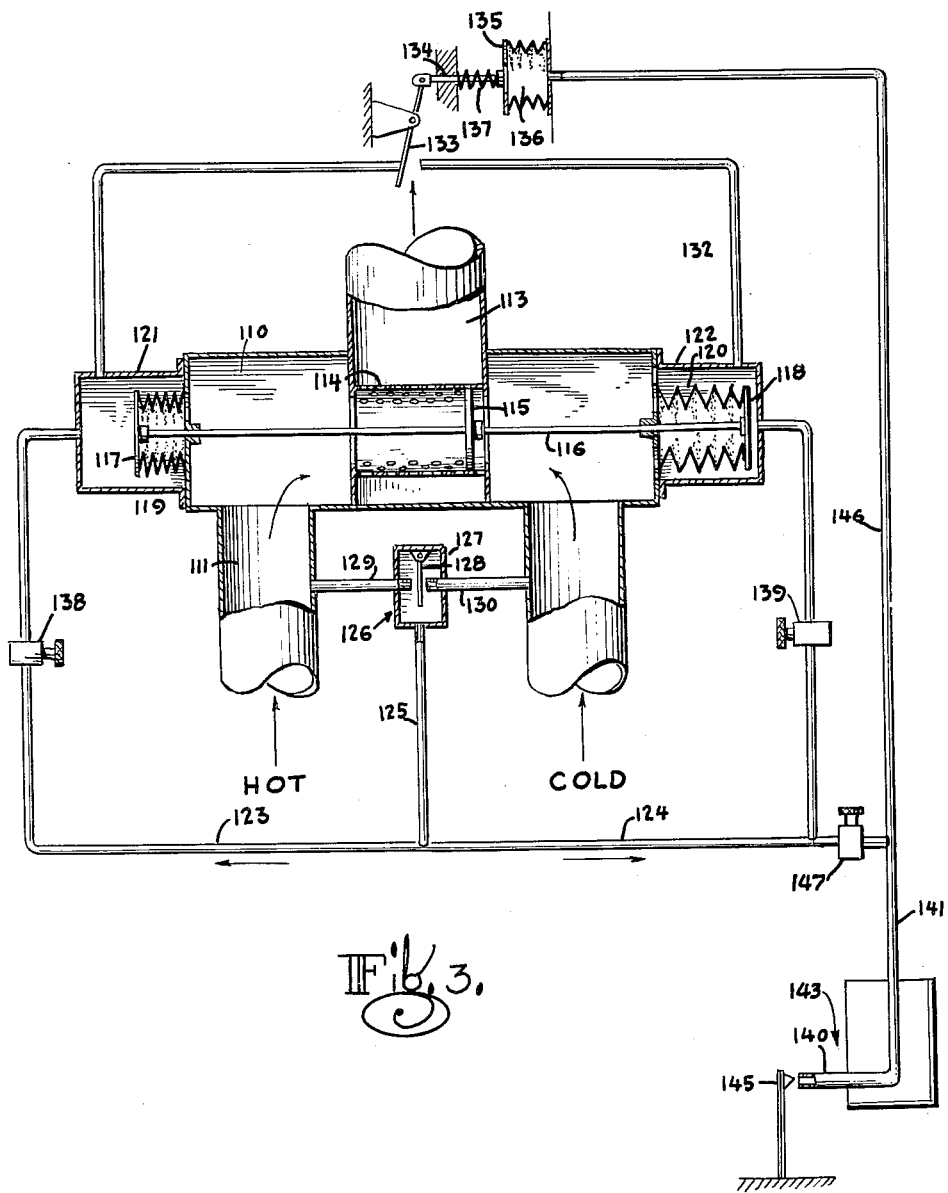

2,997,240
AIR CONDITIONING SYSTEM MIXING VALVE
Joseph W. Kreuttner, North Tarrytown, N.Y., assignor, by mesne assignments, to Buensod-Stacey Corporation, a corporation of Ohio
Filed Sept. 23, 1957, Ser. No. 685,707
4 Claims. (Cl. 236—13)

This invention relates to air conditioning apparatus, and especially to an improved air distributing unit for proportioning and mixing warm and cold air and for distributing such air into a room or zone. More particularly, it relates to a thermostatically controlled damper organization in which the power for adjusting the damper is derived from the air within the system.

Where warm air and cold air are separately supplied to individually regulated zone distributing units for mixing and subsequent distribution of the mixed air into a zone to be conditioned, dampers are usually provided to proportion warm air and cold air in proper amounts for producing desired room temperatures. In many prior devices, whenever existing air flow conditions were changed in response to variation in room temperature, objectionable audible noises were produced, especially in high pressure systems. It is known that by maintaining substantially constant volumetric rates, or by preventing more than a predetermined volume of conditioned air from discharging into a zone, such objectionable noises are avoided, even though the proportional amounts of warm air and cold air discharged are changed. Damper adjusting means have been provided for damper organizations capable of overcoming such objectionable noises, but the operation of such prior-known damper adjusting means has been effected by external sources of power independent of the air in the system.

One of the principal objects of this invention is to provide improved ambient temperature controlled air conditioning units which proportion, mix and discharge warm and cold air in a noiseless manner, and which may be operated by power derived from the pressure of air within the system.

Another object of the present invention is to provide a self-contained, power operated damper adjusting means within a mixing chamber supplied with warm and cold air and in which variations in pressure in the warm and cold air ducts do not affect the operation of the damper.

Still another object of the invention is to provide a damper means within a warm and cold air distributing unit which is operated by power derived from the pressure of the air within the unit, but controlled by an external source of power, and in which variations in pressure within the warm and cold air ducts do not affect or tend to affect the position of the damper within the distributing unit.

Although the distributing units of the present invention are particularly suitable in high pressure air conditioning systems, they are not limited thereto and may be advantageously used in low pressure air conditioning systems. High pressure systems are preferable because relatively smaller sized ducts may be used to supply conditioned air to individual air distributing units. For example, ducts having maximum diameters of about two inches to six inches, or the equivalent, can be used in high pressure systems with static pressures usually exceeding approximately two inches of water and with the potential velocity of air in the supply ducts between about 1,500 and 3,500 feet per minute, although these values may vary slightly from those given in what is known as a high pressure system.

In one aspect of the invention, the damper operating means may take the form of a pressure-responsive diaphragm that may be resiliently urged in one direction and susceptible of being moved in the other direction by air under pressure that may be obtained from the distributing unit itself. Opposing diaphragm means may be arranged on each side of a damper element, and they may be constructed so that their effective areas equal the effective area of the corresponding side of the damper element so that the air pressure acting on either side of the damper within the mixing chamber is effectively concelled. Accordingly, variations in air pressure on each side of the damper will not affect the adjusted location of the damper element. The one side of the damper operating diaphragm means may be connected to a check valve that receives air under pressure from the warm and/or cold air ducts. Valve means may be provided between the check valve and the damper operating diaphragm and such valve may be controlled by a thermostat within the room or zone being conditioned. Variations in temperature within the room or zone being conditioned may cause the thermostatically controlled valve to apply air under pressure to, or emit it from the diaphragm that controls the damper, thereby effecting the proper operation of the damper to supply the desired quantity of mixed warm and cold air to the room being conditioned to satisfy the preset condition of the thermostat.

Another aspect of the invention may be to provide a reciprocable damper means within a warm and cold air distributing unit for directing mixed air to a room or zone being conditioned, and in which opposed, enclosed bellows-type damper operating means may be provided on each side of the damper. The effective area of each of the bellows may be equal to the effective area of the corresponding side of the damper so that variations in pressures within the warm and cold air ducts do not tend to affect the positioning of the damper within the mixing unit. Each of the bellows arrangements may be enclosed within an hermetically-sealed housing that is connected to air passages leading from a combination of check and three-way valve devices which may be supplied with air from the warm and/or cold air ducts leading to the mixing unit. The three-way valve units may be actuated either by a source of air separate from that contained within the system through a valve that is controlled by a thermostat located within the room or zone being conditioned, or the three-way valve units may be operated by a thermostatically controlled device including a built-in expanding liquid or gas element.

A third phase or embodiment of the present invention may include an arrangement similar to the one just described having enclosed bellows mechanisms on each side of the damper element, and in which the movement of the damper is effected by self-contained apparatus under the control of the air within the system and without requiring an external source of power to effect the damper operation.

These and other objects, features and advantages of the invention will become apparent from the following description of the drawings which are merely exemplary.

In the drawings:

FIGURE 1 is a vertical, sectional elevational view showing a mixing chamber for an air conditioning system to which the principles of the present invention have been applied;

FIGURE 2 is a vertical sectional elevational view of a modified form of the invention shown in FIG. 1; and FIGURE 3 is a vertical sectional elevational view of still another modification of the apparatus to which the principles of the invention have been applied as shown in FIG. 1.

Referring to the drawings, and particularly to FIG. 1, a mixing chamber 10 is shown as constructed of sheet metal or the like, and it may be of substantially rectangular or other suitable cross-sectional form. Warm and cold air ducts 11 and 12 are adapted to be connected to the mixing chamber 10 at each extremity thereof and to communicate with the interior thereof. Between the warm and cold air ducts 11 and 12, and extending into the mixing chamber 10 from a side thereof opposite that to which the ducts 11 and 12 are connected, is a discharge duct 13 and it may extend transversely through the mixing chamber 10 from its one wall 14 to its other wall 15. The duct 13 within the chamber 10 is provided with a passage 16 extending therethrough and into which is located a substantially cylindrical damper distributing housing or guide 17. While the cylindrical housing or damper guide 17 may have perforations 18 extending throughout its peripheral extent, it preferably is provided with such perforations within the upper semicircular portion thereof. The upper half of the guide 17 may take various forms or be omitted if desired. A damper 19 in the form of a cylindrical disc is fixed to a shaft 20 that is mounted for reciprocation within bearings 21 and 22 that are mounted within a recessed, open cover plate 23 and an open frame 24 supported by a housing 24'.

The disc 19 is adapted to be reciprocated from one end of the perforated cylinder 17 to the other end thereof thereby to proportion the amount of cold and warm air that passes through the perforations 18, thence to the zone or room being conditioned.

In order to prevent variations in pressure within the ducts 11 and 12 from affecting the adjusted position of the damper 19, means is provided for cancelling the effect of pressure on either side of the damper 19. In the present embodiment, this pressure cancelling means may include diaphragm means 25 and 26. The means 25 comprises a member 27 fixed to the shaft 20 and connected to a flexible diaphragm that is rigidly and hermetically secured to the one end of the mixing chamber 10. Diaphragm means 26 also includes a disc member 28 rigidly attached to the shaft 20 and connected to a diaphragm means that is likewise hermetically connected to the end of the mixing chamber opposite that on which means 25 is located. The effective area of the diaphragm means 25 is equal, or related to the effective area of the lefthand face of the damper 19, whereas the effective area of the diaphragm means 26 is equal, or related to the effective area of the righthand face of the damper 19. Atmospheric pressure acts on the outside of diaphragm 25 through open frame 23 and on the lefthand side of diaphragm 26, the interior of housing 24' being in communication with the atmosphere. Accordingly, the pressure within either of the ducts 11 and 12 in no way affects the adjusted position of the damper 19 within the valve 17 since the corresponding diaphragm means 25 and 26 negatives any effect of said pressure on the damper 19.

Axial adjustment of the damper 19 within the guide or housing 17 is adapted to be effected by the movement of a spring and diaphragm means arranged in the righthand end of housing 24'. The shaft 20 is adapted to extend into the housing 24' and is guided by bearing 22 as previously described. The righthand end of shaft 20 is securely attached to a diaphragm 29 that is enclosed within the housing 24' by a cover plate 30. A tension spring 31' is connected to the righthand end of the shaft 20 and the center of the cover 30, said spring tending to move the shaft to the right in FIG. 1. The chamber formed between the cover 30 and the diaphragm 29 is adapted to be subjected to air under controlled pressure from the ducts 11 and 12 by a conduit 31.

Air under pressure may be supplied to the line 31 from the ducts 11 and 12 from a check valve 32. The valve 32 includes a housing 33 in which is located a pivotally mounted plate or valve member 34 that is adapted to be swung or oscillated between two positions to establish communication between either duct 11 or 12 and conduit 31. A duct 35 leading from the air duct 11 to the housing 33 of the valve 32 is in axial alignment with a duct 36 leading from duct 12 to the housing 33. A plate 34 is adapted to be located between the ends of the ducts 35 and 36 within the housing 33 so that it will be forced into position closing the duct 35 or 36, depending upon whether a higher pressure exists in either duct 11 or duct 12. In this way, the highest pressure within ducts 11 and 12 will always be supplied to the conduit 31, and the plate 34 prevents direct communication between the ducts 11 and 12 through valve 32.

A line 37 branches off line 31 and leads to a conventional thermostatically operated device indicated generally at 38 that is provided with an atmospheric bleed port or nozzle 39 and flapper 39'. A restriction 40 is provided through which air is fed to duct 31 from valve 32, this restriction being related to the bleed port 39 so that air can be bled faster than it can be supplied to line 31 past the restriction 40, as is known in the art.

With the apparatus in the condition as shown in FIG. 1, identical pressures within 11 and 12 maintain the plate 34 centrally of the ducts 35 and 36 so that air under pressure from both ducts 11 and 12 passes through the conduit 31 toward the diaphragm 29. However, since the bleed port 39 is open, the restricted flow of air escapes to atmosphere faster than it passes through the restriction 40 so that the pressure in line 31 and on diaphragm 29 will decrease. Since the pressure is reduced on the diaphragm 29, the spring 31' causes movement of the damper 19 to its rightward position, thereby cutting off the supply of cold air to the outlet 13 and permitting the maximum of warm air to pass therethrough. When the temperature in the room or zone being conditioned rises to a point above the preset condition of the thermostat, closure 39' closes the bleed port 39. This causes air pressure within the conduit 31 to increase so as to force the diaphragm 29 and consequently the damper 19 leftwardly so as to decrease the amount of warm air and to increase the amount of cold air being admitted to the outlet 13. This will give a proper mixture of warm and cold air to satisfy the demands of the thermostat within the room or zone being conditioned. Any location to which the damper 19 is moved by the spring 31' and diaphragm 29, of course, is unaffected by variations in pressure within ducts 11 and 12 due to the action of the diaphragm means 25 and 26, as previously described.

Referring to FIG. 2, the principles of the invention are shown as applied to an air conditioning mixing chamber 50 to which two conduits 51 and 52 are connected for supplying thereto warm and cold air. An outlet 53 substantially identical with the outlet 13 of FIG. 1 extends into the mixing chamber 50 in substantially the same way as the outlet 13 extends into the mixing chamber 10 of FIG. 1.

A perforated cylinder or suitable guide 54 may be located within the outlet 53, and a disc-like damper 55 is adapted to be reciprocated therein, all as more specifically described in connection with the operation of the damper 19 and the guide 17 of FIG. 1. A shaft 56, to which the damper 55 is fixed, extends through and is supported by bearings 57 and 58 that are mounted in the end walls of the chamber 50. The outer extremities of the shaft 56 are provided with identical discs 59 and 59' which are connected by bellows mechanisms 60 and 61 to openings 63 and 64 of housings 65 and 66 that are fixed to the opposite ends of the mixing chamber 50. Sealing means or gaskets 67 and 68 are provided between the housings 65 and 66 and the ends of the chamber 50.

In the design disclosed in FIG. 2, communication exists between the chamber 50 and the chambers 69 and 70 formed by the discs 59 and 59', the bellows 60, 61, and the opposite end walls of the chamber 50. The effective area of the disc and bellows means at each extremity of the shaft 56 is such that it equals or is related to the effective area of the corresponding face of the damper 55 so that variations in pressure within the ducts 51 and 52 will be cancelled and not tend to displace any preset adjustment of the damper 55 in the cylinder 54.

Movement of the damper 55 within the cylinder 54 is adapted to be effected by the air under pressure within the ducts 51 and 52, and to this end a check valve 71 is provided into which ducts 72 and 73 admit air from ducts 51 and 52, respectively. Ducts 72 and 73 are in alignment and slightly spaced apart at their inner ends, so as to admit a plate 74 that is pivotally mounted within the valve housing 71'. The outlet from the check valve 71 extends through a conduit 75 and branches in two directions 76 and 77. The branch 76 leads to one port 78 of a three-way valve 79, the three-way valve 79 including port 80 as well as an exhaust port 81. A conventional valve spool 82 within the three-way valve 79 is connected to a link 83 that extends into and is connected to a similar spool 84 within another three-way valve 85 substantially identical with the three-way valve 79. The branch 77 extends to one port 86 of the three-way valve 85, which latter includes another port 87 and an exhaust port 88. Spool 84 has a link 89 attached thereto which extends to an air motor having a cylinder 90 where it is connected to a piston 91. A compression spring 92 within the cylinder 90 is adapted to urge the piston 91 rightwardly, and pressure fluid is adapted to be admitted through a port 93 into the cylinder 90 on the righthand side of the piston 91. A source of air supply 94 separate from that of the system is connected through a restriction 95 to a conventional pneumatic control means indicated generally at 96. Exhaust bleed port or nozzle at 97 is adapted to be closed or opened by thermostatically controlled flapper means 98.

The port 80 of the three-way valve 79 is connected to a line 99 leading to the housing 65. The port 87 of the three-way valve 85 is connected to a line 100 that leads to housing 66.

With the closure 98 in position as shown in FIG. 2, i.e., preventing the bleeding of the air from supply 94 through the nozzle 97, piston 91 is forced leftwardly together with the spools 84 and 82. Accordingly, the housing 66 is open to the exhaust port 88 and the housing 65 is supplied with air under pressure from the duct 51 or 52, depending upon which can supply air at the highest pressure to valve 71. Pressure within housing 65 forces damper 55 rightwardly into the position shown, thereby increasing the amount of warm air flowing from duct 51 into the outlet 53 and reducing to a minimum the amount of cold air flowing from duct 52 into outlet 53. If the temperature in the room or zone being conditioned rises due to a surplus of warm air being admitted to it, the thermostatic control closure 98 moves to a position where the separate supply of air 94 is bled to atmosphere through the port 97. This causes the spring 92 to move piston 91 together with spools 82 and 84 rightwardly. Movement of the spool 82 rightwardly causes the housing 65 to be opened to the exhaust port 81, and connects the housing 66 to the branch 77 whereupon the disc 59' is caused to move leftwardly, thereby moving the damper 55 leftwardly to decrease the amount of warm air being admitted to the outlet 53 and increase the amount of cold air being admitted thereto. Throughout the operation of the damper 55, it is evident that variations in pressure within the ducts 51 and 52 will not affect its adjusted position in the same way that variations in pressure in ducts 11 and 12 do not affect the damper 19 shown in FIG. 1.

Referring to FIG. 3, the principles of the invention are shown as applied to an aparatus somewhat similar to that shown in FIG. 2 but characterized in that it is a self-contained unit as distinguished from that shown in FIG. 2 wherein a separate source of air under pressure is required to operate the three-way valves 79 and 85. A mixing chamber 110 somewhat similar to the mixing chambers 50 and 10 of FIGS. 2 and 1, is provided with warm and cold air ducts 111 and 112 on opposite sides of an outlet duct 113 within the latter of which is located a damper guide 114. A disc-like damper 115 is adapted to be reciprocated within the guide or cylinder 114 in much the same manner as the dampers 19 and 55 are adapted to be reciprocated within the guides 17 and 54 of FIGS. 1 and 2. The damper 115 is fixed to a shaft 116 mounted for reciprocation in aligned bearings located in the end walls of the chamber 110. Discs 117 and 118 are attached to opposite ends of shaft 116 and they are connected to bellows 119 and 120 which are hermetically sealed to the end walls of chamber 110. Housings 121 and 122 surround the exterior of the bellows 119 and 120, respectively, forming pressure chambers adapted to have air under pressure supplied thereto and exhausted therefrom to effect the reciprocation of the damper 115.

Air under pressure from either of the ducts 111 and 112 is adapted to be admitted to the housings 121 and 122 through lines 123 and 124 that are supplied by a duct 125 leading from a check valve 126. The valve 126 includes a chamber 127 within which is mounted a plate 128 that is pivotally supported for oscillation between two limiting points. Aligned ducts 129 and 130 extend from ducts 111 and 112 into the valve 126. The plate 128 is normally suspended between the adjacent ends of the ducts 129 and 130 and is forced into sealing relation with the end of duct 129 or 130, whichever contains air at the lower pressure. This arrangement prevents communication between the ducts 111 and 112 through the valve 126, but permits air from the duct 111 or 112 that has the higher pressure to be continuously supplied to the line 125.

Housings 121 and 122 are provided with lines 131 and 132, respectively, which exhaust into the atmosphere from ends that are in aligned relation and slightly spaced apart. A valve plate 133 is pivotally supported between the outlet ends of the ducts 131 and 132 and it is connected to a drawbar 134 that is integral with a disc 135 forming part of a bellows mechanism 136. A compression spring 137 normally urges the bellows mechanism 136 toward its collapsed position and consequently forces the plate 133 into contact with the exhaust end of the line 131.

A valve 138 is located within the line 123 and is adapted manually to be preset to restrict the passage of air through the line 123 to an amount less than the amount that is capable of being exhausted to the atmosphere through the line 131 when its outlet is uncovered by the plate 133. Likewise, a manually-operable valve 139 is located in the line 124 leading to the housing 122 and it is preset in the same manner as the restrictor valve 138, i.e., so that the normal passage of air through the line 124 to the housing 122 is restricted to a predetermined rate less than the rate of exhaust through the line 132 when the plate 133 uncovers the outlet of line 132.

A branch 140 from line 124 leads to a line 141 that is connected to a control means indicated generally at 143 having a bleed port or nozzle 144. Bleed port 144 is adapted to be closed or opened by the action of a thermostatically-controlled flapper means 145 located within the room or zone being conditioned. Branch 140 also includes a line 146 leading to the bellows mechanism 136, and a presettable restrictor valve or restriction 147 is located in the branch 140 which is related to the bleed port 144 in such a manner to prevent the passage of air past it in an amount greater than that which will freely pass the bleed port 144 when it is open.

With the apparatus in the condition shown in FIG. 3, the closure 145 does not affect the bleed port 144 and consequently bellows mechanism 136 is in its collapsed position due to the action of the spring 137. Accordingly, plate 133 covers the outlet to duct 131, thereby exhausting the space within the housing 122 to the atmosphere. Air under pressure from either of ducts 111 or 112, depending upon which is at the higher pressure, passes through the line 125, thence through line 123 to the housing 121, acting on the disc 117 of the bellows mechanism 119, forcing the damper 115 rightwardly, thereby causing a greater amount of hot air and a lesser amount of cold air to pass into the outlet 113. As the temperature in the room or zone being treated increases by virtue of the increased amount of warm air being supplied to it, the thermostatically controlled closure 145 blocks the bleed port 144, thereby causing air under pressure to pass through the line 146, thence into the bellows mechanism 136. Accordingly, the bellows mechanism 136 expands against the action of the spring 137, causing the plate 133 to move from the position shown in FIG. 3 to a position where it blocks the exit of the duct 132 and opens the exit of the duct 131. Accordingly, the housing 121 is exhausted to atmosphere, and the pressure within line 125 passes through line 124, thence into the housing 122 forcing the disc 118, and consequently the damper 115, leftwardly to thereby increase the amount of cold air that is supplied to the outlet 113 and reduce the amount of warm air that is supplied thereto. In this manner, an accurate proportioning of the warm and cold air supplied to a zone or room being treated can be controlled substantially noiselessly by the air under pressure within the system and in such a manner that variations in pressure within the warm and cold air ducts will not affect the positioning of the distributing damper.

Although the various features of the new and improved mixing valve for air conditioning systems have been shown and described in detail to fully disclose several embodiments of the invention, it will be evident that numerous changes may be made in such details, and certain features may be used without others without departing from the principles of the invention.

What is claimed is:

1. A mixing valve for air conditioning systems including a mixing chamber; separate warm and cool air ducts leading to said mixing chamber; an outlet from said mixing chamber adapted to lead to a room or zone being conditioned; damper means located between the warm and cool air duct inlets to said mixing chamber and having sides exposed to the pressure in each inlet respectively; diaphragm means connected at one side to each of the opposite sides of said damper means, each diaphragm means having an effective area related to the effective area of the corresponding side of said damper means, so as to prevent variations in air pressure within the warm and cool air ducts from affecting the position of said damper within said mixing chamber; means for supplying air under the highest pressure from either of said warm or cool air ducts to said diaphragm means at a side which is opposite to that connected to said damper means for operating the same; and zone temperature responsive means for controlling the flow of air to said diaphragm means so that said damper will proportion hot and cool air to said outlet in accordance with zone temperature.

2. A mixing valve for air conditioning systems including a mixing chamber; separate warm and cool air ducts leading to said mixing chamber; an outlet from said mixing chamber adapted to lead to a room or zone being conditioned; damper means located between the warm and cool air duct inlets to said mixing chamber and having sides exposed to the pressure in each inlet respectively; diaphragm means connected at one side to each of the opposite sides of said damper means, each diaphragm means having an effective area related to the effective area of the corresponding side of said damper means, so as to prevent variations in air pressure within the warm and cool air ducts from affecting the position of said damper within said mixing chamber; resilient means for urging said damper means in one direction; means for supplying air under the highest pressure from either of said warm or cool air ducts to one of said diaphragm means at a side which is opposite to that connected to said damper means for operating the same; and zone temperature responsive means for controlling the flow of air to said diaphragm means so that said damper will proportion hot and cool air to said outlet in accordance with zone temperature.

3. A mixing valve for air conditioning systems including a mixing chamber; separate warm and cool air ducts leading to said mixing chamber; an outlet from said mixing chamber adapted to lead to a room or zone being conditioned; damper means located between the warm and cool air duct inlets to said mixing chamber and having sides exposed to the pressure in each inlet respectively; diaphragm means connected at one side to each of the opposite sides of said damper means, each diaphragm means having an effective area related to the effective area of the corresponding sides of said damper means, so as to prevent variations in air pressure within the warm and cool air ducts from affecting the position of said damper within said mixing chambers; means for supplying air under the highest pressure from either of said warm or cool air ducts to said diaphragm means on sides opposite to that connected to said damper means for operating the same; and zone temperature responsive means for controlling the flow of air to one or the other of said diaphragm means so that said damper will proportion hot and cool air to said outlet in accordance with zone temperature.

4. A mixing valve for air conditioning systems including a mixing chamber; separate warm and cool air ducts leading to said mixing chamber; an outlet from said mixing chamber adapted to lead to a room or zone being conditioned; disc-like damper means located between the warm and cool air duct inlets to said mixing chamber and having sides exposed to the pressure in each inlet respectively; drawbar means extending from each side of said damper means; diaphragm means connected to each of the opposite ends of said drawbar means, each diaphragm means having an effective area related to the effective area of the corresponding side of said damper means, so as to prevent variations in air pressure within the warm and cool air ducts from affecting the position of said damper within said mixing chamber; means for supplying air under the highest pressure from either of said warm or cool air ducts to said diaphragm means at a side opposite to that connected to said damper means for operating the same; and zone temperature responsive means for controlling the flow of air to said diaphragm means so that said damper will proportion hot and cool air to said outlet in accordance with zone temperature.

References Cited in the file of this patent

UNITED STATES PATENTS

| 1,076,293 | Lawler | Oct. 21, 1913 |
| 1,087,908 | Reineke et al. | Feb. 17, 1914 |
| 1,819,045 | Snediker | Aug. 18, 1931 |
| 1,846,698 | Trane | Feb. 23, 1932 |
| 1,847,911 | Trane | Mar. 1, 1932 |
| 1,869,663 | Cartier | Aug. 2, 1932 |
| 1,986,429 | Dunham | Jan. 1, 1935 |
| 2,019,724 | Otto | Nov. 5, 1935 |
| 2,308,861 | Clifford | Jan. 19, 1943 |
| 2,720,151 | Kreuttner | Oct. 11, 1955 |

FOREIGN PATENTS

| 163,906 | Australia | July 5, 1955 |
| 253,317 | Great Britain | June 17, 1926 |

OTHER REFERENCES

Handbook for Machine Designers Etc., by F. A. Halsey, second edition, published 1916, by McGraw-Hill, pages 315 and 316.